(12) United States Patent
Seaton et al.

(10) Patent No.: US 8,670,867 B2
(45) Date of Patent: Mar. 11, 2014

(54) ROBOT MILKING ARM AND A METHOD OF ATTACHING MILKING CUPS

(75) Inventors: Mark Hamish Seaton, Dunedin (NZ); Thomas Glover, Christchurch (NZ); Bryan Gordan Grimshaw, Christchurch (NZ); David Bates, Christchurch (NZ); Peter Knotts, Christchurch (NZ); Matthew Jack, Christchurch (NZ)

(73) Assignee: Scott Milktech Limited, Dunedin (NZ)

( * ) Notice: Subject to any disclaimer, the term of this patent is extended or adjusted under 35 U.S.C. 154(b) by 595 days.

(21) Appl. No.: 12/921,750

(22) PCT Filed: Mar. 11, 2009

(86) PCT No.: PCT/NZ2009/000036
§ 371 (c)(1),
(2), (4) Date: Dec. 7, 2010

(87) PCT Pub. No.: WO2009/113884
PCT Pub. Date: Sep. 17, 2009

(65) Prior Publication Data
US 2011/0087372 A1    Apr. 14, 2011

(30) Foreign Application Priority Data

Mar. 11, 2008 (NZ) ........................................ 566631
Oct. 20, 2008 (NZ) ........................................ 572157

(51) Int. Cl.
*A01J 7/00*    (2006.01)
(52) U.S. Cl.
USPC ............. 700/245; 901/1; 119/651; 119/14.45

(58) Field of Classification Search
USPC ...................... 119/14.45, 651; 700/245; 901/1
See application file for complete search history.

(56) References Cited

U.S. PATENT DOCUMENTS

| | | |
|---|---|---|
| 3,690,300 A | 9/1972 | Tonelli |
| 4,508,058 A | 4/1985 | Jakobson et al. |
| 4,941,433 A | 7/1990 | Hanauer |
| 5,042,428 A | 8/1991 | van der Lely et al. |
| 5,634,428 A | 6/1997 | Koster |
| 5,769,025 A * | 6/1998 | van der Lely et al. ..... 119/14.42 |
| 5,778,820 A * | 7/1998 | van der Lely et al. ..... 119/14.18 |

(Continued)

FOREIGN PATENT DOCUMENTS

| | | |
|---|---|---|
| DE | 10351549 A1 | 6/2005 |
| EP | 0091892 A2 | 10/1983 |

(Continued)

*Primary Examiner* — Ronnie Mancho
(74) *Attorney, Agent, or Firm* — KPPB LLP

(57) ABSTRACT

A robotic milking system suitable for use with conventional milking clusters. Clusters are withdrawn to a generally known position upon release from a cow with the cups hanging down below the bowl. The cups are then located in a confined region from where they are picked up by a robotic arm and attached to teats of a cow. The cups may be located into recesses or slots or be drawn through a guide. The arrangement allows a single robotic arm to service multiple bales of a rotary milking parlor. The application of a vacuum to milking cups may be controlled by applying sufficient pressure to the pulsation line of a cup to collapse the cup liner when that cup is not attached to a teat or by bending a feed line to a cup to close the flow path.

22 Claims, 12 Drawing Sheets

(56) References Cited

U.S. PATENT DOCUMENTS

| | | | |
|---|---|---|---|
| 5,909,716 A | 6/1999 | van der Lely | |
| 5,934,220 A | 8/1999 | Hall et al. | |
| 5,950,561 A | 9/1999 | Redmond et al. | |
| 5,950,562 A * | 9/1999 | Schulte et al. | 119/51.02 |
| 6,044,793 A | 4/2000 | van der Lely | |
| 6,116,188 A | 9/2000 | van der Lely | |
| 6,213,051 B1 | 4/2001 | Fransen | |
| 6,279,507 B1 | 8/2001 | van der Lely et al. | |
| 6,697,821 B2 | 2/2004 | Ziff et al. | |
| 6,948,449 B2 | 9/2005 | van der Lingen et al. | |
| 7,334,537 B2 | 2/2008 | van den Berg et al. | |
| 2002/0033138 A1 | 3/2002 | Brayer | |
| 2004/0168645 A1 | 9/2004 | Deelstra | |
| 2006/0196432 A1 | 9/2006 | Peacock | |
| 2007/0277737 A1 * | 12/2007 | Maier et al. | 119/14.45 |

FOREIGN PATENT DOCUMENTS

| | | |
|---|---|---|
| EP | 0300115 B1 | 1/1988 |
| EP | 0306579 B1 | 1/1992 |
| EP | 0349019 B1 | 1/1993 |
| EP | 0689761 A1 | 1/1996 |
| EP | 0900522 A1 | 3/1999 |
| EP | 0258938 B2 | 9/1999 |
| EP | 0611004 B1 | 1/2000 |
| EP | 0689762 B2 | 8/2000 |
| EP | 0689761 B1 | 10/2000 |
| EP | 0643909 B1 | 12/2000 |
| EP | 0880888 B1 | 9/2002 |
| EP | 0973377 B1 | 11/2002 |
| EP | 0900000 B1 | 7/2003 |
| EP | 1447001 A1 | 8/2004 |
| EP | 1172030 B1 | 9/2004 |
| EP | 1166625 B1 | 11/2005 |
| EP | 1279327 B1 | 5/2007 |
| EP | 1537774 B1 | 5/2007 |
| EP | 0688162 B2 | 1/2008 |
| JP | 2000-4703 | 1/2000 |
| NZ | 229131 A | 6/1991 |
| NZ | 512411 A | 12/2002 |
| WO | WO 9963807 A1 | 12/1999 |
| WO | WO 9966786 A1 | 12/1999 |
| WO | 0072664 A1 | 12/2000 |
| WO | 0172116 A1 | 10/2001 |
| WO | 0215676 A1 | 2/2002 |
| WO | 2004062352 A1 | 7/2004 |
| WO | 2005015985 A3 | 5/2005 |
| WO | 2005122753 A1 | 12/2005 |
| WO | 2008104416 A1 | 9/2008 |
| WO | 2008118068 A1 | 10/2008 |
| WO | 2008118069 A1 | 10/2008 |

* cited by examiner

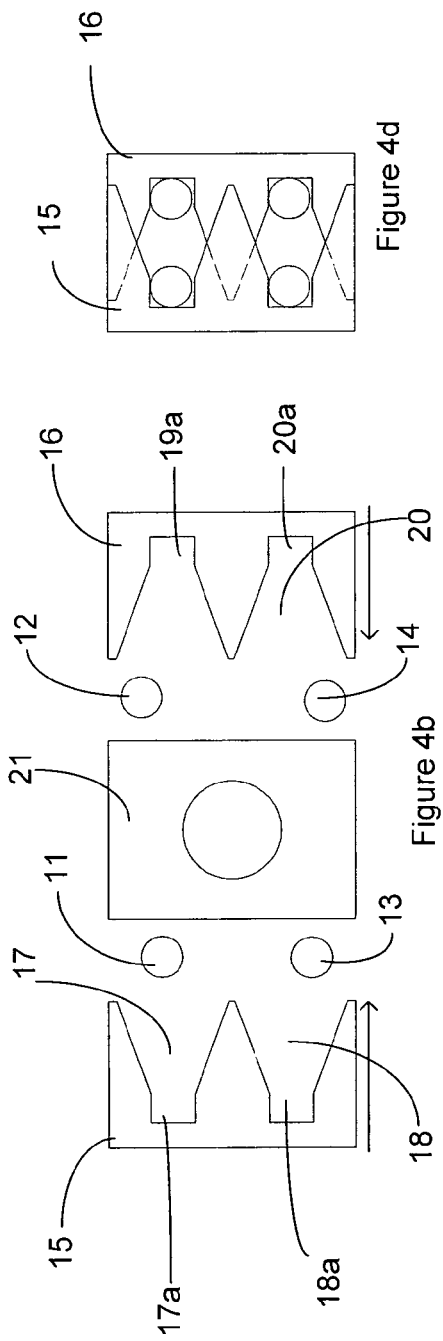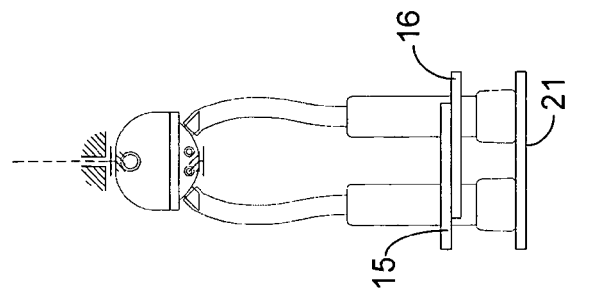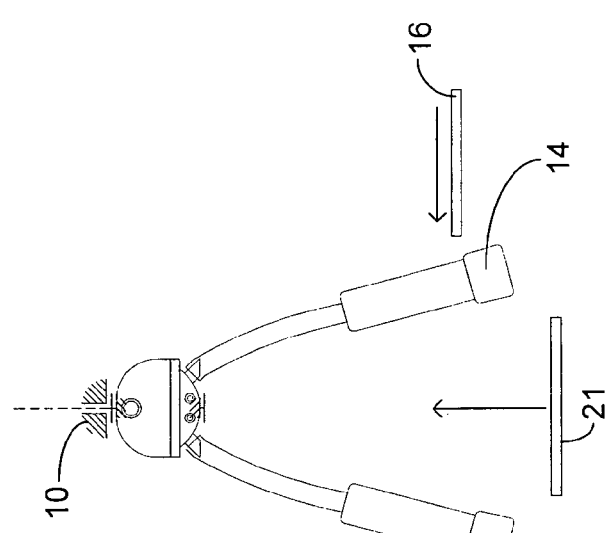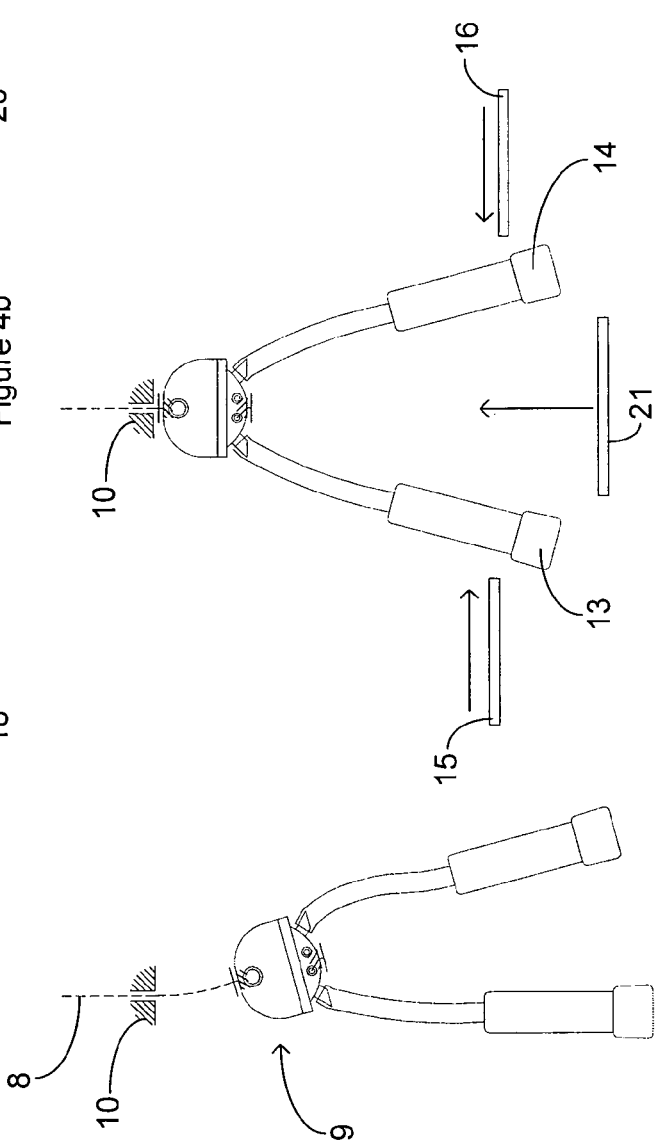

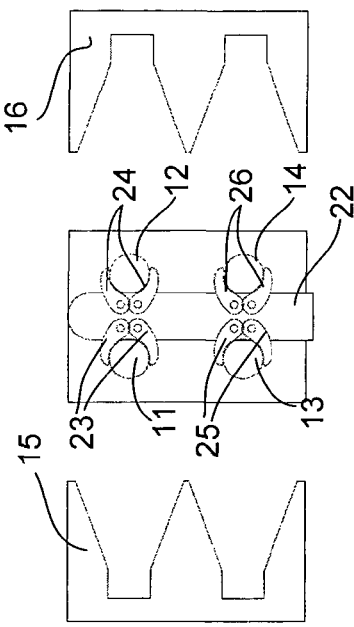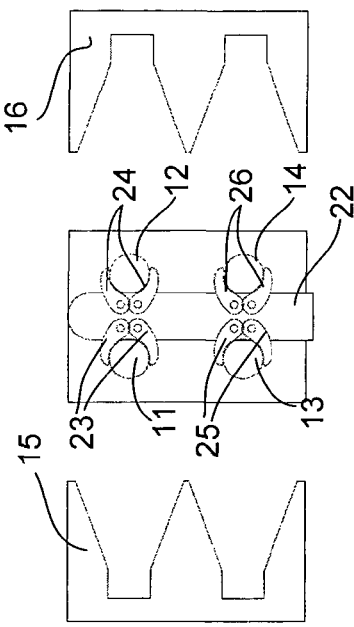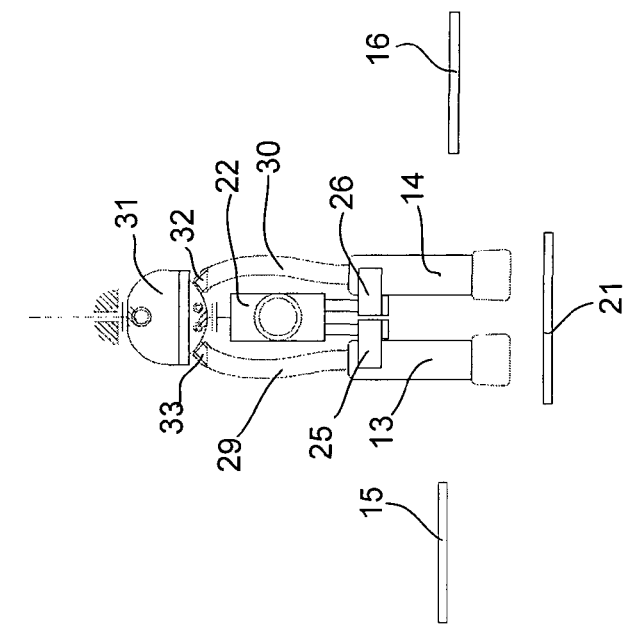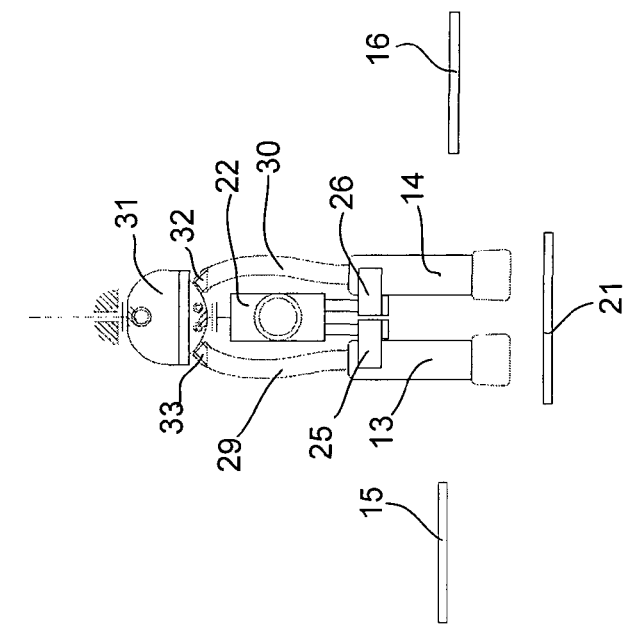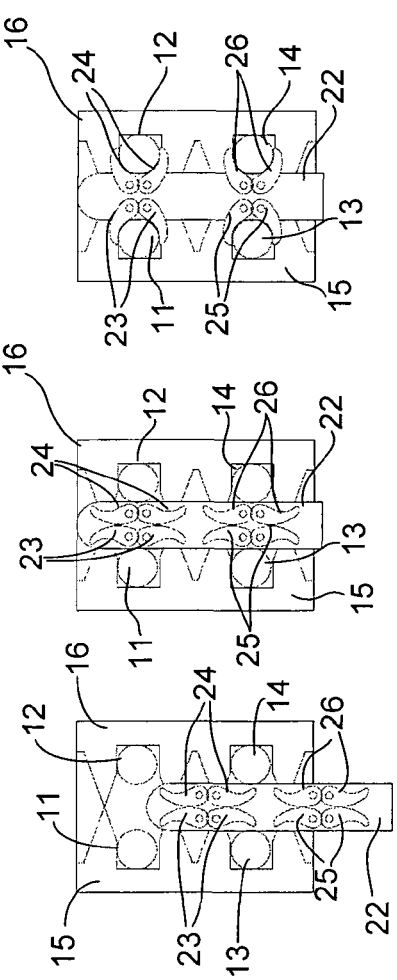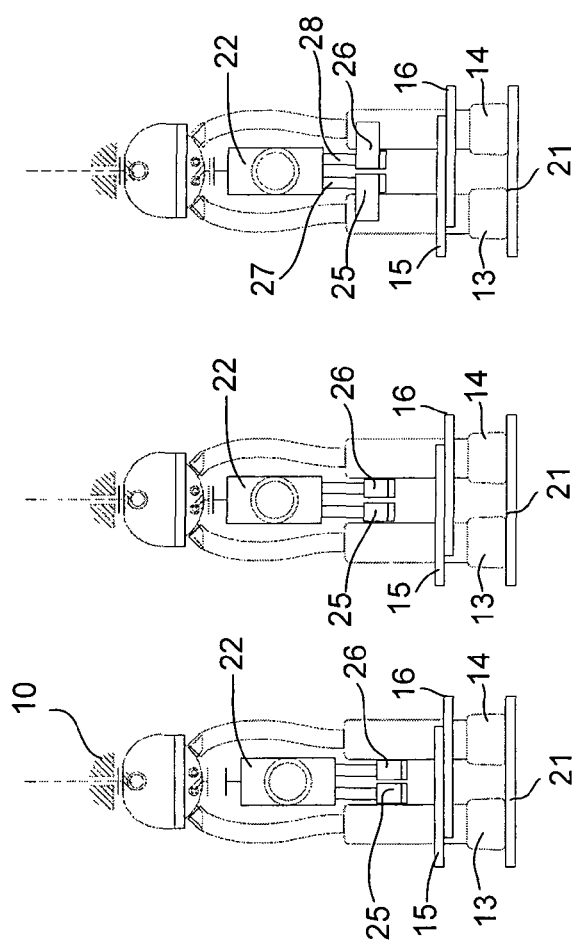

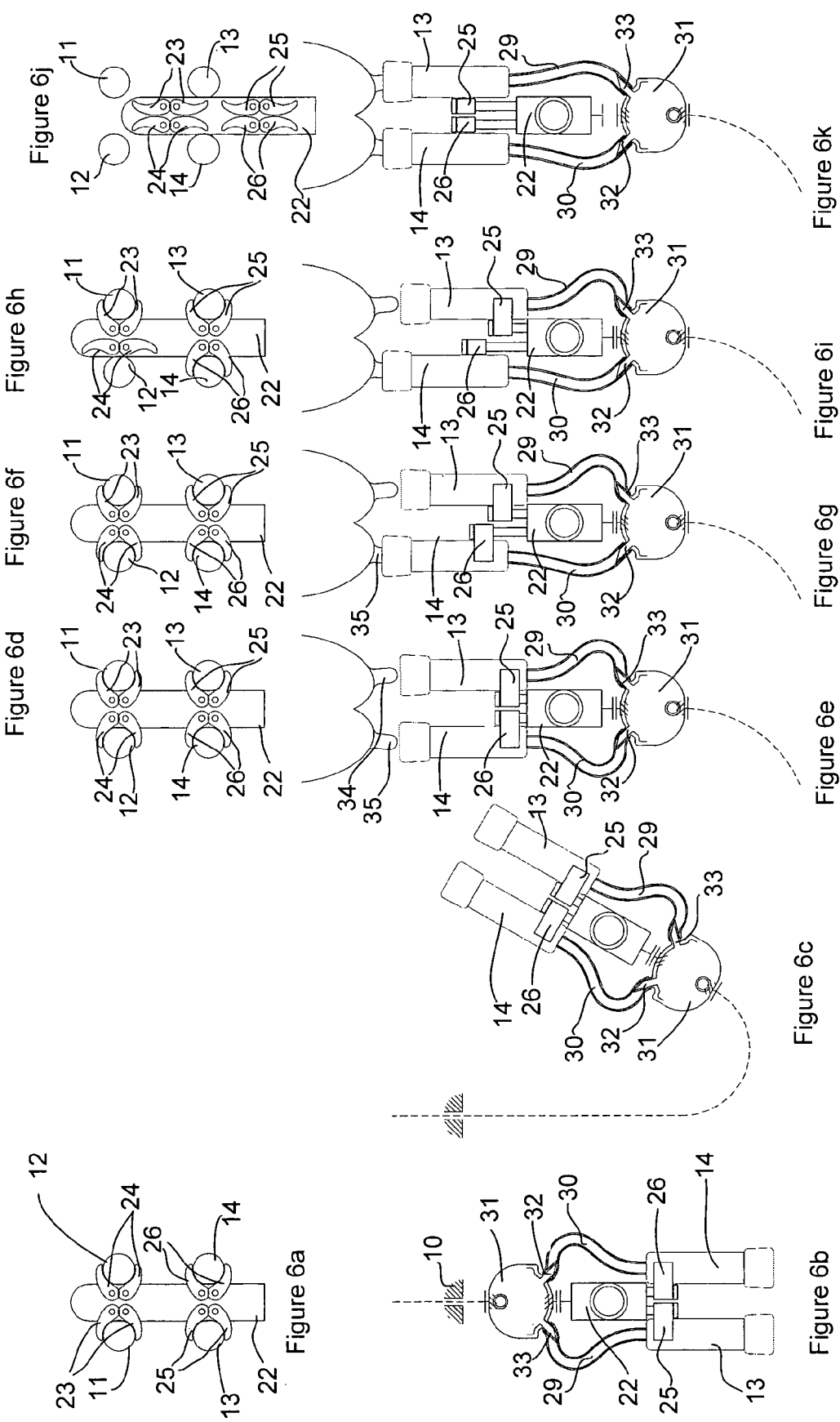

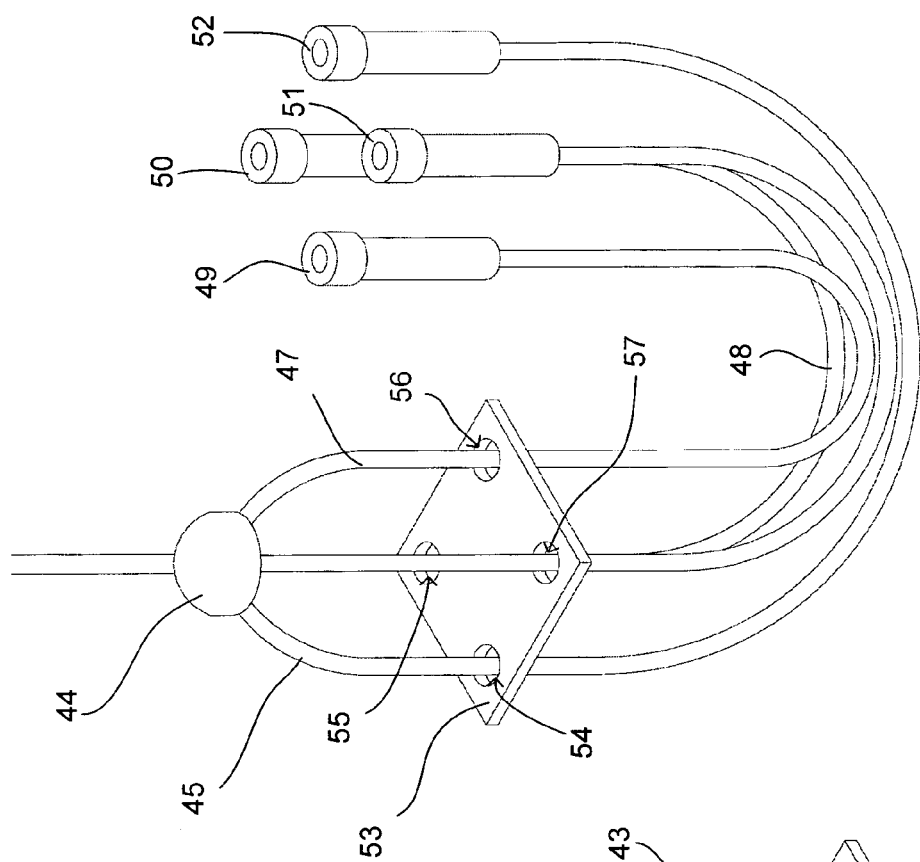
Figure 10
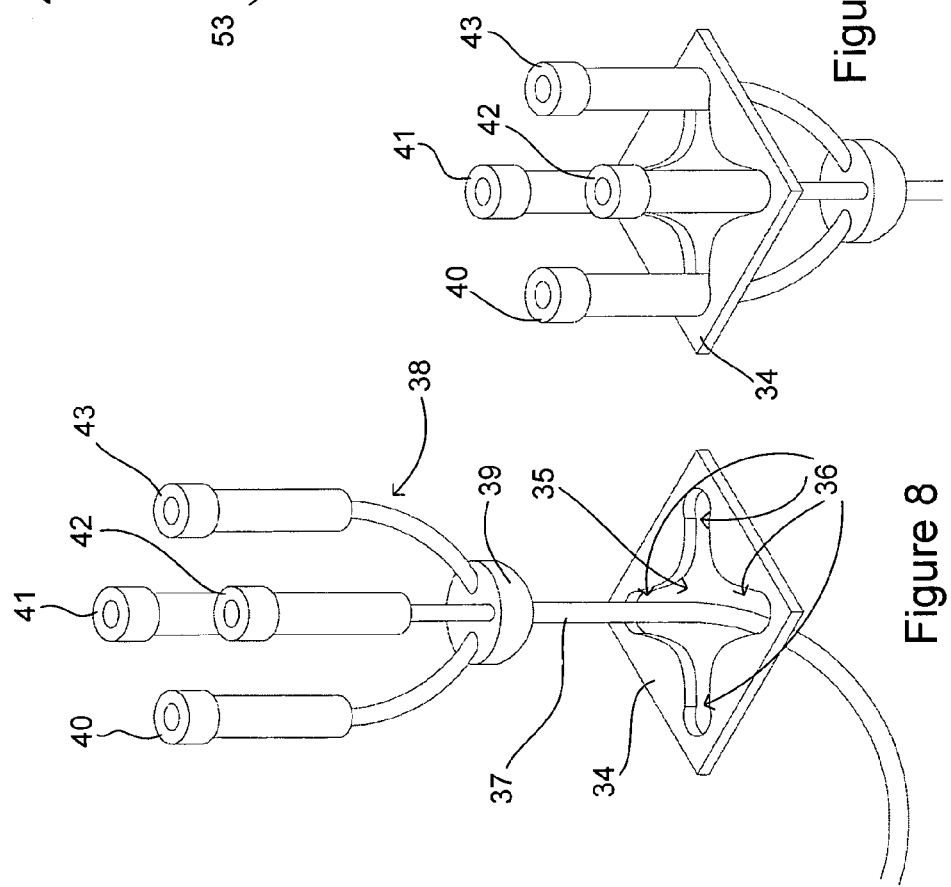
Figure 9
Figure 8

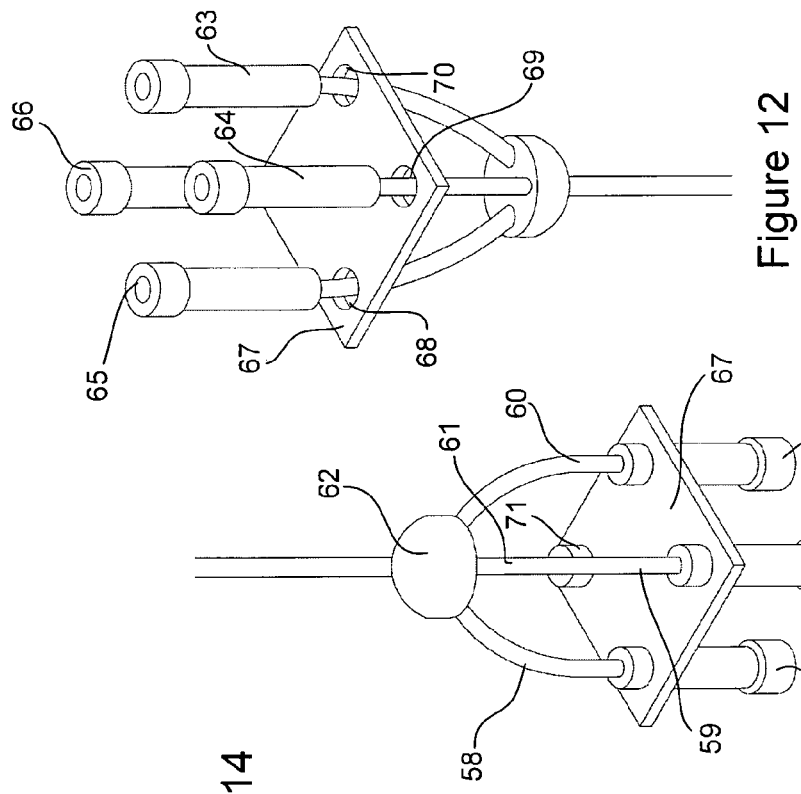
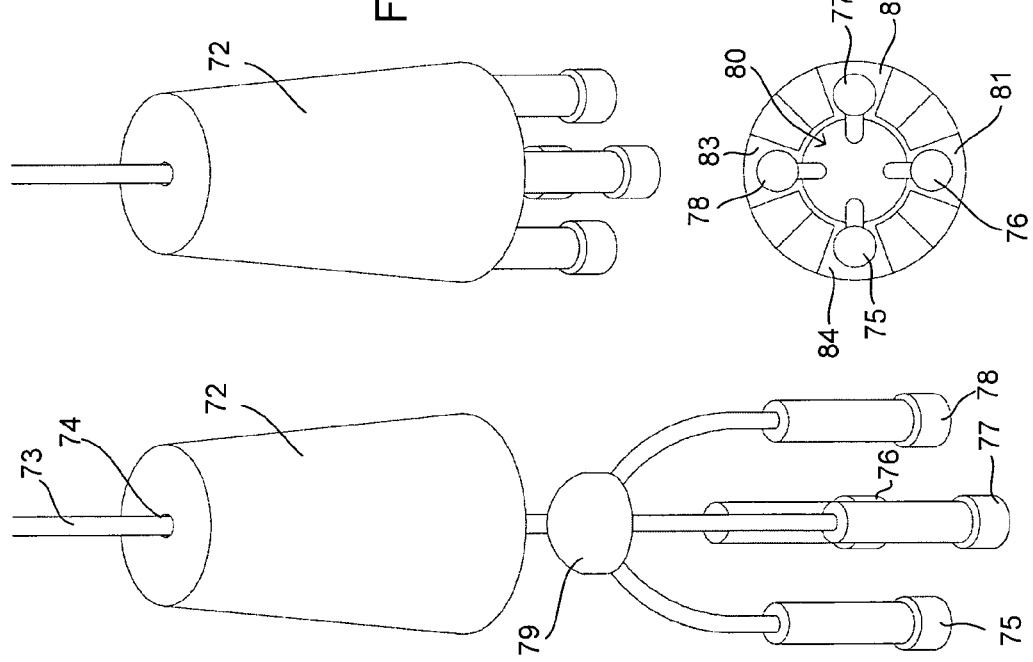

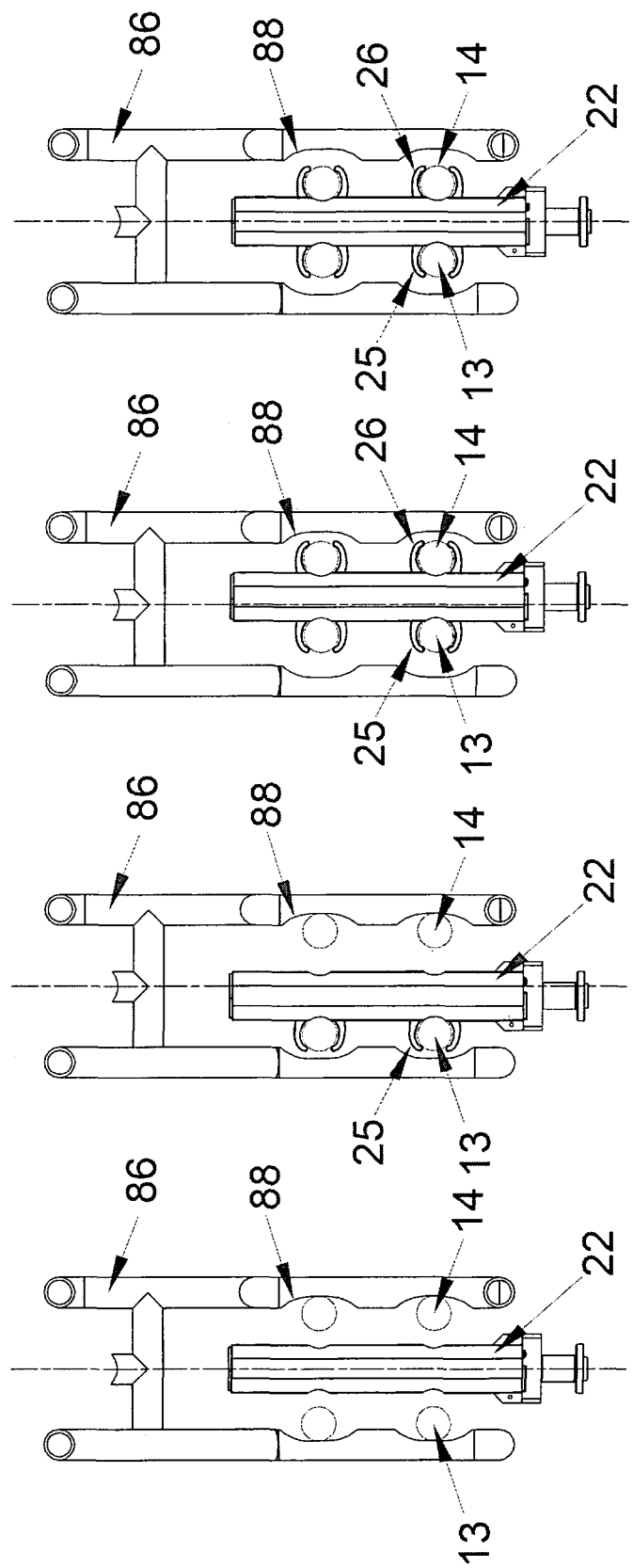

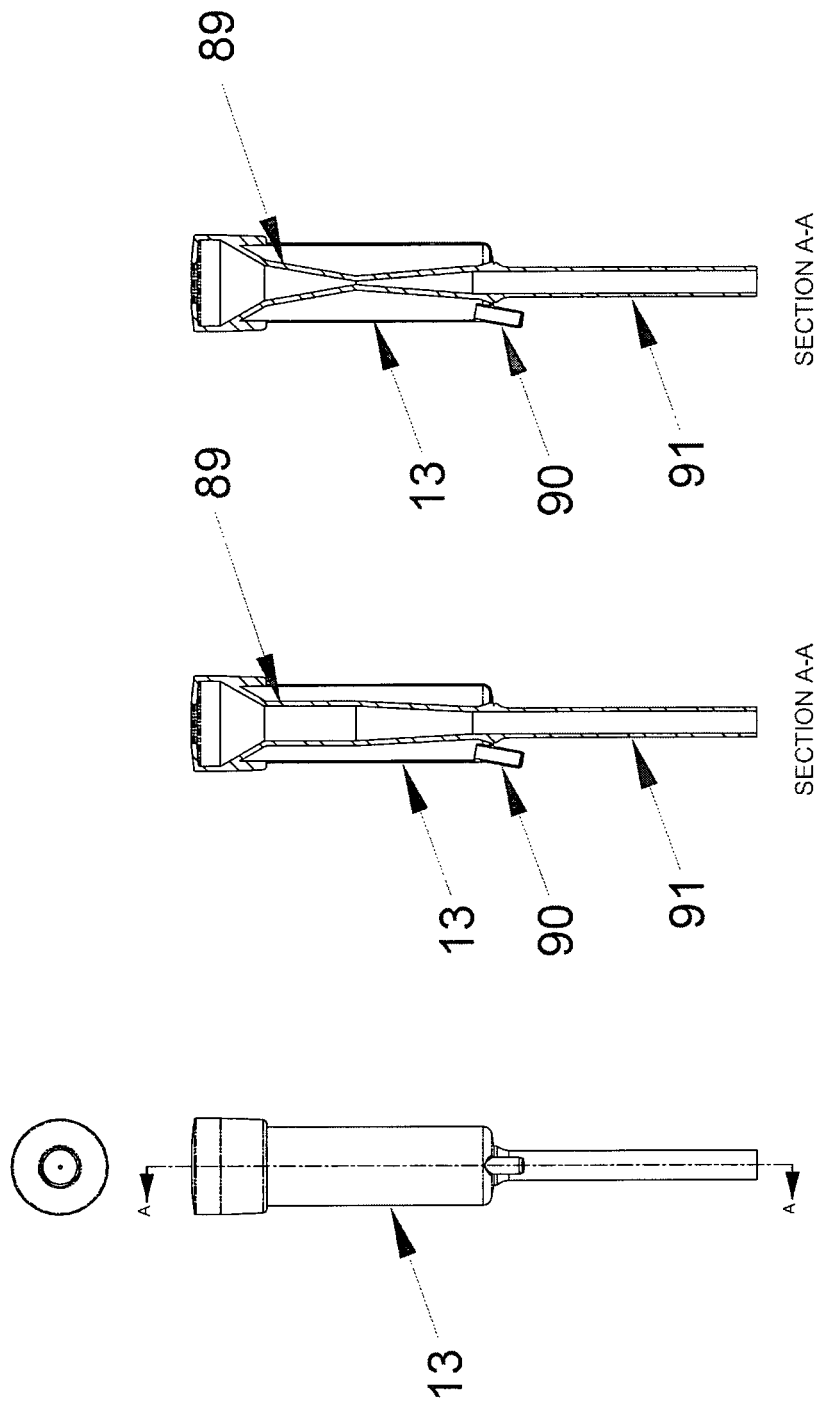

ROBOT MILKING ARM AND A METHOD OF ATTACHING MILKING CUPS

FIELD OF THE INVENTION

This invention relates to a robotic milking system and a method of attaching milking cups to the teats of an animal to be milked, particularly cows. It also relates to a milking parlour incorporating such a milking system.

BACKGROUND OF THE INVENTION

Manual and semi-automated animal milking systems are in widespread use. The predominant system currently used employs a "standard milking cluster" including a bowl (such as the Waikato 320 Claw supplied by Waikato Milking Systems of Waikato, New Zealand) connected to milking cups via feed lines. Such systems require an operator to attach and remove the cups.

A number of milking robot designs are in commercial use, such as the Lely ASTRONAUT range. Such milking robots typically service only a single animal at a time. Due to throughput limitations this requires several expensive robots to be employed or requires milking to occur over an extended period. Further, such robots are not compatible with standard milking clusters with the milking cups being incorporated within the robot arm. Others, such as the De Laval VMS range pick up and attach each cup independently, with each cup being on a separate hose, rather than a cluster. Thus they cannot economically be retrofitted to conventional milking parlours.

WO00/72664 discloses a milking robot having milking cups integrated into the robot arm. This milking robot requires one arm per milking bale.

EP689761 discloses a milking parlour in which one robot services the bales of a rotary platform but provides no details as to the construction of the robotic arm.

U.S. Pat. No. 4,508,058 discloses one robotic arm servicing a rotary platform but provides no disclosure as to how the cups are located by the milking arm.

It would be desirable to provide a robotic arm and method of milking that allowed a robotic arm to attach the cups of a standard milking cluster for a number of bales of a standard parlour or to at least provide the public with a useful choice.

STATEMENTS OF INVENTION

According to one exemplary embodiment there is provided a method of acquiring and attaching a plurality of cups of a milking cluster using a robotic arm that is not permanently attached to the milking cluster, the method comprising the steps of:
 a. withdrawing the cluster so that the cups of the cluster hang below a bowl of the cluster;
 b. acquiring the plurality of cups with the robotic arm; and
 c. attaching the cups to the teats of an animal with the robotic arm.

According to another exemplary embodiment there is provided a robotic milking system comprising:
 a. a milking cluster having a plurality of cups connected to a bowl;
 b. means to withdraw the cluster so that the cups hang down below the bowl;
 c. a robotic arm that is not permanently attached to the milking cluster including holding means arranged to acquire and hold the plurality of cups of the cluster as they hang below the bowl and actuators for moving the arm to facilitate the attachment of the cups to a cow.

According to another exemplary embodiment there is provided a method of controlling the application of a vacuum to milking cups comprising applying sufficient pressure to the pulsation line of the cup to collapse the cup liner when that cup is not attached to a teat.

According to another exemplary embodiment there is provided a method of controlling the application of a vacuum to cups of a milking cluster including a bowl and respective feed lines from the bowl to each cup wherein each feed line to each cup includes a valve which closes the feed line when the feed line is curved beyond a certain extent and opens when the feed line is not so curved; the method comprising:
 a. holding the cups with a robotic milking arm such that the feed lines are curved such as to close each feed line whilst a vacuum is applied to the cluster; and
 b. prior to attaching a cup to a teat, moving the cup so as to straighten the feed line to that cup so as to apply a vacuum to that cup.

According to another exemplary embodiment there is provided a robotic milking system comprising:
 a. a robotic arm including actuators for moving the robotic arm to facilitate the attachment of cups to a cow;
 b. a milking cluster comprising a bowl having a plurality of feed lines connected to a plurality of cups;
 c. holding means associated with the robotic arm; and
 d. means to apply pressure to the pulsation line of selected cups to collapse the cup liner.

According to a further exemplary embodiment there is provided a robotic milking system comprising:
 a. a robotic arm including actuators for moving the robotic arm to facilitate the attachment of cups to a cow;
 b. a milking cluster comprising a bowl having a plurality of feed lines connected to a plurality of cups, wherein each feed line includes a valve which closes the feed line when the feed line is curved beyond a certain extent and opens when the feed line is not so curved;
 c. holding means associated with the robotic arm which, prior to connecting a cup to a teat, holds the cup so that the feed line is curved such that the feed line is closed and, prior to attaching a cup, moves the cup so as to open the feed line.

According to another exemplary embodiment there is provided a method of locating one or more cups of a milking cluster comprising retracting a milking cluster through a guide which is configured and arranged to position the one or more cups in desired positions as the cups are drawn towards the guide.

According to another exemplary embodiment there is provided a milking cluster guide having a central aperture with radiating slots configured and arranged to allow a bowl of a milking cluster to pass therethrough and to position cups of the milking cluster at the distal regions of the slots when a milking cluster is drawn therethrough.

According to another exemplary embodiment there is provided a milking cluster comprising a bowl, a plurality of cups, a plurality of feed lines connecting the cups to the bowl and a guide having a plurality of apertures therein wherein the feed lines pass through the apertures in the guide.

According to another exemplary embodiment there is provided a milking cluster guide in the form of a sheath configured to receive a milking cluster and position cups of the milking cluster in desired positions.

According to a still further exemplary embodiment there is provided a method of acquiring cups of a milking cluster using a robotic arm comprising:

a. locating each cup within a known region; and
b. acquiring each cup with the robotic arm whilst that cup is retained in the known region.

According to still a further exemplary embodiment there is provided a method of acquiring and attaching a plurality of cups of a milking cluster using a robotic arm that is not permanently attached to the milking cluster, the method comprising the steps of:
a. supporting the cluster so that the cups of the cluster hang below a bowl of the cluster;
b. acquiring the plurality of cups with the robotic arm; and
c. attaching the cups to the teats of an animal with the robotic arm.

According to still a further exemplary embodiment the method includes embodiments wherein the cluster is supported via a retractable line attached to the bowl.

According to still a further exemplary embodiment the method includes embodiments wherein the cluster is retracted from an in use position to a supported position by the retractable line.

According to still a further exemplary embodiment the method includes embodiments wherein a milking parlour bale has a series of guide recesses into which the milking cups are located as the cluster is being retracted.

According to still a further exemplary embodiment the method includes the steps for each cup of:
a. advancing a guide having a narrowing slot towards the cup such that as the guide is advanced it locates the cup within a confined region of the slot; and
b. holding the cup when located in the confined region.

According to still a further exemplary embodiment the method includes embodiments wherein two pairs of opposing guides, each having two narrowing slots, are brought together to locate four cups within the confined region of each slot.

According to still a further exemplary embodiment the method includes embodiments wherein a leveling element is raised from below the cups to ensure that they are at a desired height before the cups are held.

According to still a further exemplary embodiment the method includes embodiments wherein a plurality of cups is simultaneously located.

According to still a further exemplary embodiment the method includes embodiments wherein the cups are held by grippers of the robotic arm.

According to still a further exemplary embodiment the method includes embodiments wherein the grippers are in the form of a pair of opposed arms with internal jaws shaped to grip a cup.

According to still a further exemplary embodiment the method includes embodiments wherein two pairs of grippers are provided back to back in opposing directions with a pair of guides opposing and movable towards each pair of grippers and with each jaw aligned with the confined region of each slot.

According to still a further exemplary embodiment the method includes embodiments wherein the cups are gripped by suction cups.

According to still a further exemplary embodiment the method includes embodiments wherein, after each cup is held, it is inverted to face upwardly.

According to still a further exemplary embodiment the method includes embodiments including the step of placing a set of milking cups onto a cow's teats, wherein the cups of the milking cluster are not all placed on the teats at the same time and the vacuum flow to any cups not placed on the teats is restricted in order to minimize vacuum loss to cups that are placed on the teats.

According to still a further exemplary embodiment the method includes embodiments where pressure is applied to the pulsation line of cups not attached to the teats, such that the pressure is sufficient to collapse the cup liner.

According to still a further exemplary embodiment the method includes embodiments where vacuum flow to cups not attached to the teats is restricted by mechanical means.

According to still a further exemplary embodiment the method includes embodiments wherein each cup is initially held so that its associated feed line is curved to close it and straightened to open it before applying the cup to the teat of an animal.

According to still a further exemplary embodiment the method includes embodiments wherein each feed line is curved by moving its associated cup towards the bowl.

According to still a further exemplary embodiment the method includes embodiments wherein there is one robotic arm serving multiple bales of a milking parlour.

According to still a further exemplary embodiment the method includes embodiments wherein the milking parlour has a rotating platform.

According to still a further exemplary embodiment the method includes embodiments wherein cup attachment is guided by a vision system.

According to still a further exemplary embodiment the method includes embodiments wherein the robotic arm extends through the rear legs of an animal when attaching cups.

According to still a further exemplary embodiment the invention includes a robotic milking system comprising:
a. a milking cluster having a plurality of cups connected to a bowl;
b. means to withdraw the cluster so that the cups hang down below the bowl; and
c. a robotic arm that is not permanently attached to the milking cluster including holding means arranged to acquire and hold the plurality of cups of the cluster as they hang below the bowl and actuators for moving the arm to facilitate the attachment of the cups to an animal.

According to still a further exemplary embodiment the robotic milking system includes embodiments including means for locating each cup within a recess in a guide.

According to still a further exemplary embodiment the robotic milking system includes embodiments including a guide which, in use, is adapted to advance towards one or more cups and guide each cup to a respective confined region.

According to still a further exemplary embodiment the robotic milking system includes embodiments wherein the guide has multiple slots for locating multiple cups and the holding means has multiple means for holding the cups.

According to still a further exemplary embodiment the robotic milking system includes embodiments wherein the guide means includes two pairs of opposing guides, each having two narrowing slots.

According to still a further exemplary embodiment the robotic milking system includes embodiments including a leveling element moveable towards the holding means to position cups in use at a desired height before they are held.

According to still a further exemplary embodiment the robotic milking system includes embodiments wherein the cups are held by grippers.

According to still a further exemplary embodiment the robotic milking system includes embodiments wherein the grippers are in the form of a pair of opposed arms with internal jaws shaped to grip a cup.

According to still a further exemplary embodiment the robotic milking system includes embodiments wherein two pairs of grippers are provided back to back facing in opposing directions with a pair of guides opposing and movable towards each pair of grippers and with each jaw of each gripper aligned with the confined region of each slot.

According to still a further exemplary embodiment the robotic milking system includes embodiments wherein the cups are gripped by suction cups.

According to still a further exemplary embodiment the robotic milking system includes embodiments wherein the holding means is rotatable between a cup location orientation and a cup application orientation.

According to still a further exemplary embodiment the robotic milking system includes embodiments whereby the cups of the milking cluster are not all placed on the teats at the same time, and the vacuum flow to any cups not placed on the teats is restricted in order to minimize vacuum loss to cups that are placed on the teats.

According to still a further exemplary embodiment the robotic milking system includes embodiments where the cups include a pulsation line and pressure is applied to the pulsation line of cups not attached to the teats, such that the pressure is sufficient to collapse the cup liner.

According to still a further exemplary embodiment the robotic milking system includes embodiments where vacuum flow to cups not attached to the teats is restricted by mechanical means.

According to still a further exemplary embodiment the robotic milking system includes embodiments wherein the holding means includes means for altering the curvature of a feed line to each cup.

According to still a further exemplary embodiment the robotic milking system includes embodiments wherein the holding means includes means for independently raising each cup.

According to still a further exemplary embodiment the robotic milking system includes embodiments wherein cup attachment is guided by a vision system.

According to still a further exemplary embodiment the robotic milking system includes embodiments wherein the robotic milking system independently controls the application of a vacuum to each cup.

According to still a further exemplary embodiment the invention is directed to a milking comprising a plurality of bales and a robotic milking system for applying cups of conventional milking clusters in each bale.

According to still a further exemplary embodiment the milking parlour includes embodiments wherein the milking parlour has a rotating platform.

According to still a further exemplary embodiment the milking parlour includes embodiments wherein the robotic arm is arranged so as to operate through the rear legs of an animal when attaching cups.

According to still a further exemplary embodiment the milking parlour includes embodiments wherein each milking cluster retracts to a position for cup acquisition upon release from an animal.

According to still a further exemplary embodiment the milking parlour includes embodiments wherein the bowl is secured by a retractable line in a bale of a milking parlour.

According to still a further exemplary embodiment the invention is directed to a method of controlling the application of a vacuum to milking cups comprising applying sufficient pressure to the pulsation line of the cup to collapse the cup liner when that cup is not attached to a teat.

According to still a further exemplary embodiment the invention is directed to a method of controlling the application of a vacuum to cups of a milking cluster including a bowl and respective feed lines from the bowl to each cup wherein each feed line to each cup includes a valve which closes the feed line when the feed line is curved beyond a certain extent and opens when the feed line is not so curved; the method comprising:
 a. holding the cups with a robotic milking arm such that the feed lines are curved such as to close each feed line whilst a vacuum is applied to the cluster; and
 b. prior to attaching a cup to a teat, moving the cup so as to straighten the feed line to that cup so as to apply a vacuum to that cup.

According to still a further exemplary embodiment the invention is directed to a robotic milking system comprising:
 a. a robotic arm including actuators for moving the robotic arm to facilitate the attachment of cups to a cow;
 b. a milking cluster comprising a bowl having a plurality of feed lines connected to a plurality of cups; holding means associated with the robotic arm; and
 c. means to apply pressure to the pulsation line of selected cups to collapse the cup liner.

According to still a further exemplary embodiment the invention is directed to a robotic milking system comprising:
 a. a robotic arm including actuators for moving the robotic arm to facilitate the attachment of cups to a cow;
 b. a milking cluster comprising a bowl having a plurality of feed lines connected to a plurality of cups, wherein each feed line includes a valve which closes the feed line when the feed line is curved beyond a certain extent and opens when the feed line is not so curved; and
 c. holding means associated with the robotic arm which, prior to connecting a cup to a teat, holds the cup so that the feed line is curved such that the feed line is closed and, prior to attaching a cup, moves the cup so as to open the feed line.

According to still a further exemplary embodiment the method includes embodiments wherein each valve is formed by the cooperation between an angled inlet to the bowl and its associated feed line whereby the arrangement causes a wall of the outlet to block the feed line when it is curved towards the bowl.

According to still a further exemplary embodiment the invention is directed to a method of locating one or more cups of a milking cluster comprising retracting a bowl and feed lines of the milking cluster through an opening of a guide which is configured and arranged to position the one or more cups in desired positions as the cups are drawn towards the guide.

According to still a further exemplary embodiment the method includes embodiments wherein feed lines to the cups are guided along slots radiating from a central opening to guide the cups to desired positions.

According to still a further exemplary embodiment the method includes embodiments wherein the milking cluster is drawn down through the guide so that cups are oriented upwardly once the milking cluster has been drawn through the guide.

According to still a further exemplary embodiment the method includes embodiments wherein the guide is located centrally in a milking bale near a region of application of the cups to teats of an animal.

According to still a further exemplary embodiment the method includes embodiments wherein a cover covers the guide and cups between removal and application of the cups.

According to still a further exemplary embodiment the invention is directed to a milking cluster guide having a central aperture with radiating slots configured and arranged to allow a bowl of a milking cluster to pass therethrough and to position cups of the milking cluster at the distal regions of the slots when a milking cluster is drawn therethrough.

According to still a further exemplary embodiment the milking cluster guide includes embodiments where milking cluster guide in the form of a sheath configured to receive a milking cluster and position cups of the milking cluster in desired positions including longitudinal grooves for guiding the cups to desired positions.

According to still a further exemplary embodiment the invention is directed to a method of acquiring cups of a milking cluster using a robotic arm comprising:
 a. locating each cup within a known region; and
 b. simultaneously acquiring each cup with the robotic arm whilst that cup is retained in the known region.

According to still a further exemplary embodiment the method includes embodiments wherein all cups are simultaneously located in their respective known regions.

Preferred embodiments are set out in the claims and are incorporated in the description by reference.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIGS. 4a to 4e show a system and method for locating the cups of a standard milking cluster;

FIGS. 5a to 5h show a system and method for holding cups;

FIGS. 6a to 6k show a system and method for attaching cups to the teats of an animal.

FIG. 8 shows a guide for positioning the cups of a milking cluster.

FIG. 9 shows cups positioned in the guide shown in FIG. 8.

FIG. 10 shows an alternative guide design.

FIG. 11 shows the guide of FIG. 10 employed with a standard milking cluster.

FIG. 12 shows the arrangement of FIG. 11 when inverted.

FIG. 13 shows a method of positioning cups using a sheath type guide.

FIG. 14 shows a milking cluster drawn into the sheath type guide shown in FIG. 13.

FIG. 15 shows a bottom view of the arrangement shown in FIG. 14.

FIGS. 17a to 17d show a system and method for holding cups using the feature of FIG. 16.

FIGS. 18a to 18c show a standard milking cup and a method for restricting vacuum flow within the cup.

DETAILED DESCRIPTION OF EMBODIMENTS OF THE INVENTION

The invention will be described with reference to a milking parlour using a rotary platform. However, it is to be appreciated that the robotic milking system of the invention may be applied to any desired milking configuration.

Figure 1:
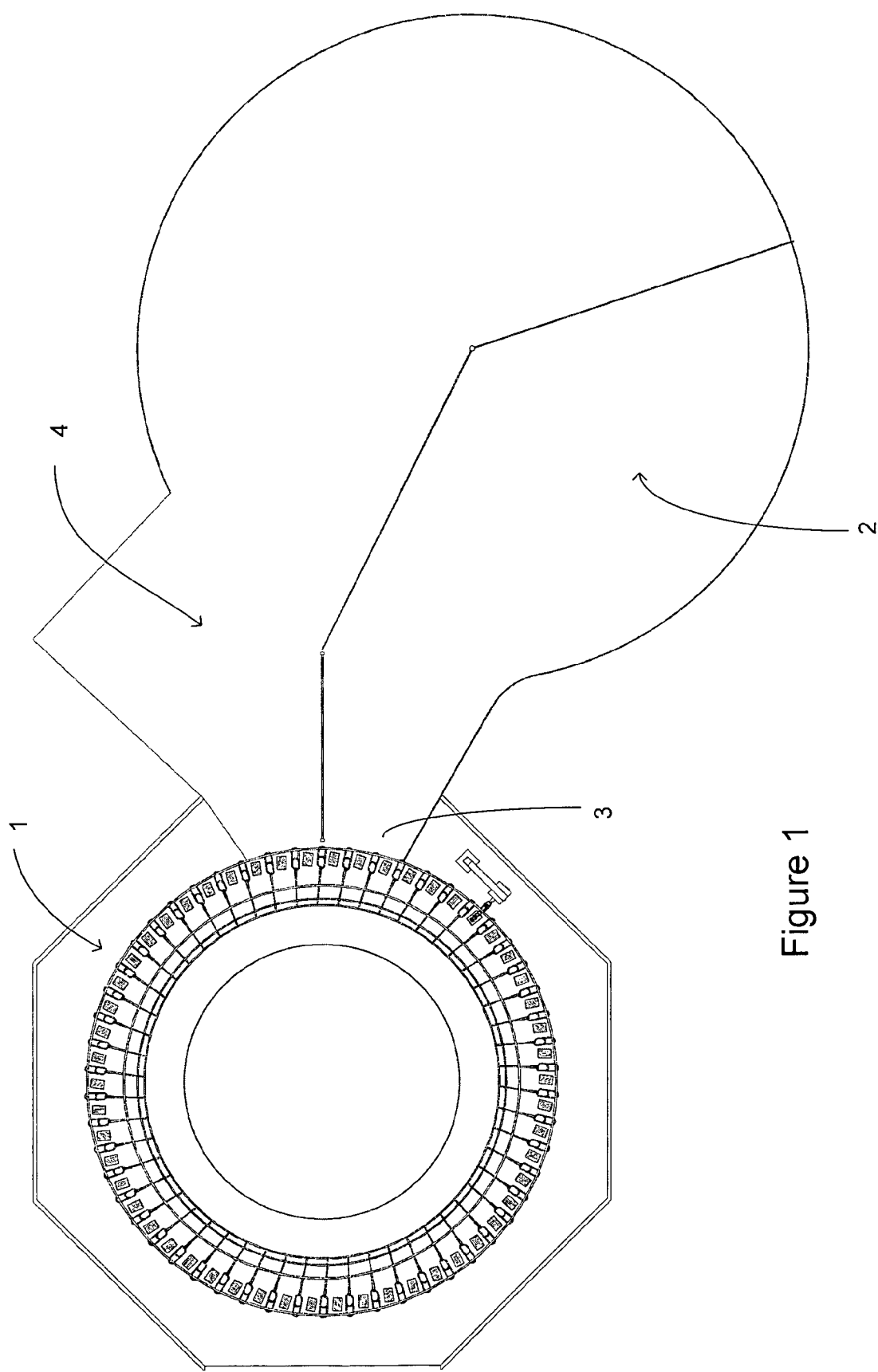
FIG. 1 shows a plan view of a milking parlour having a rotating platform.

Referring to FIG. 1 a milking parlour having a rotary platform 1 is shown. Animals enter into an entry area 2 and advance to a loading area 3. Once the rotary platform 1 has performed a revolution the cows exit via exit area 4.

Figure 2:
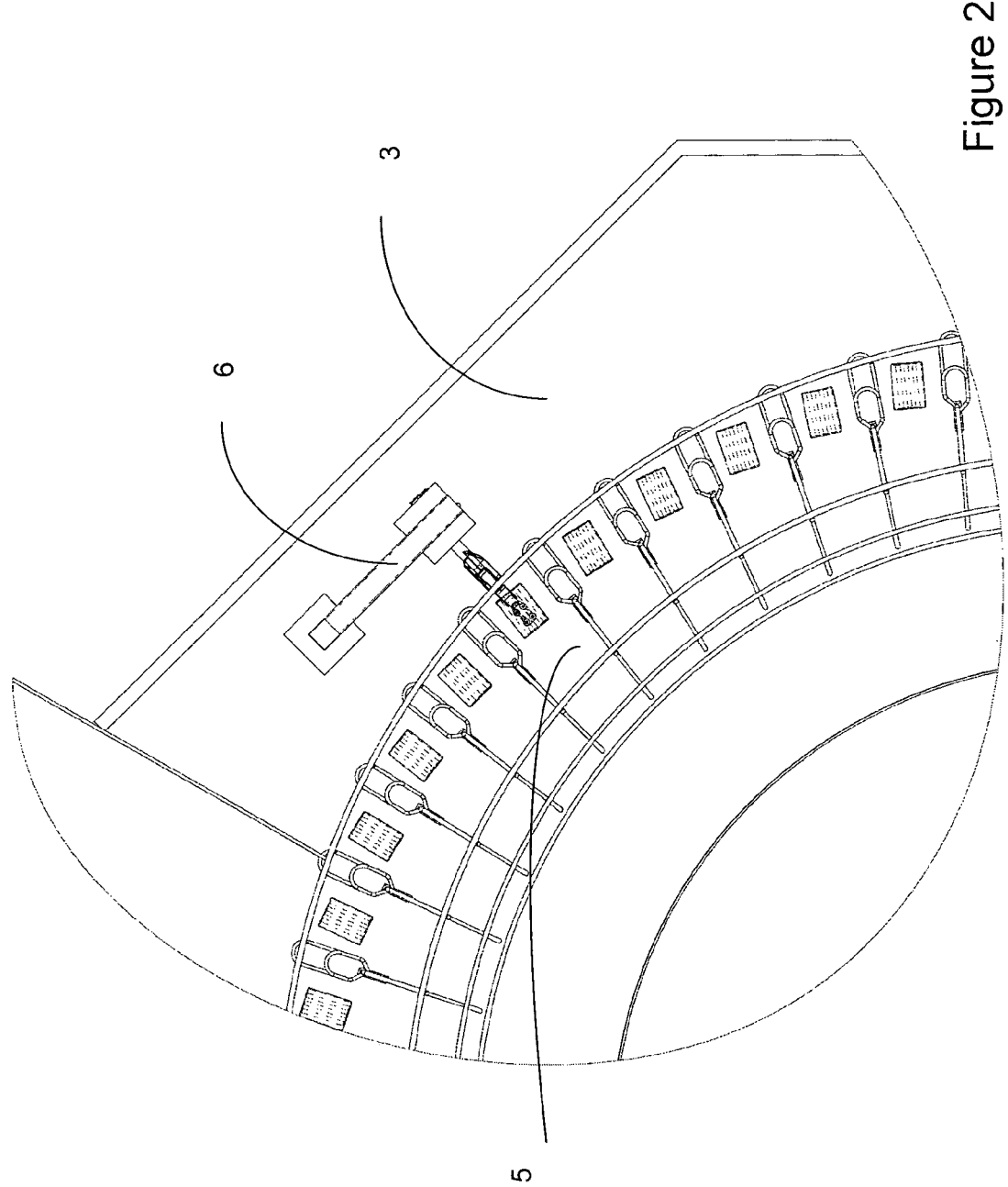
FIG. 2 shows an enlarged view of the cup loading area to the rotating platform shown in FIG. 1.
Figure 3:
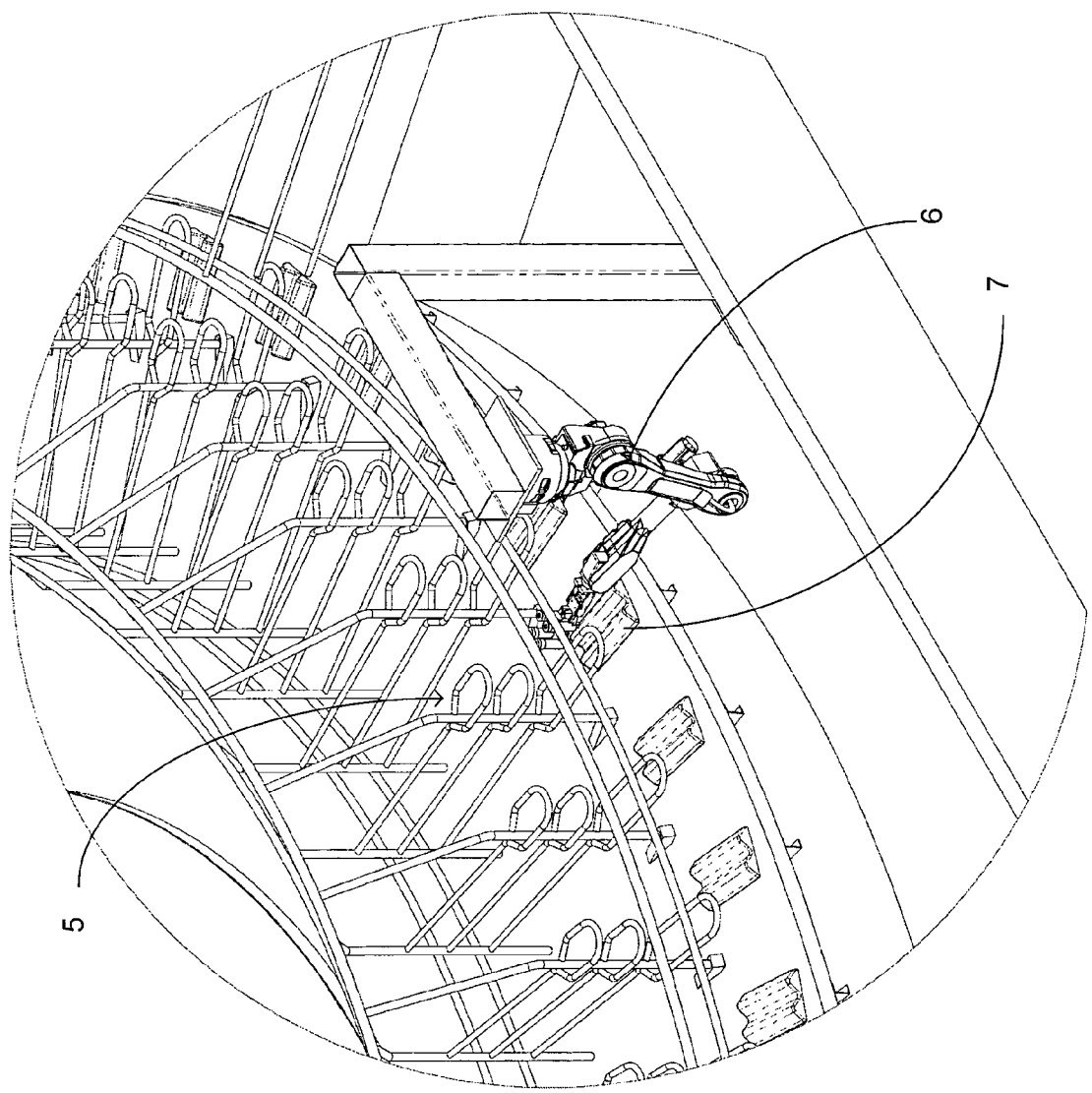
FIG. 3 shows a perspective view of a robotic arm operating in the entry area shown in FIG. 2.

As shown in FIGS. 2 and 3, from loading area 3 the cows advance into individual bales 5 of rotary platform 1. Robotic arm 6 locates the cups for each milking cluster in each bale and attaches the cups to the teats of an animal as it passes the robotic arm 6. Spreaders 7 keep the animals rear legs spread apart to facilitate operation of the robotic arm through the animal's rear legs.

Each bale has a milking cluster associated with it which supplies milk to a central milk collection system. As shown in FIG. 4a a flexible line 8 of a cup remover is connected to each cluster 9 and after the vacuum to each cluster is removed line 8 retracts cluster 9 to an anchor point 10 on the side of the bale.

FIGS. 4b to 4e show the steps involved in the location of milking cups. Milking cups 11, 12, 13 and 14 are initially hanging from anchor point 10 as shown in FIG. 4c with guides 15 and 16 located on either side and plate 21 located below the cups. Guide 15 has narrowing slots 17 and 18 leading to confined regions 17a and 18a. It will be appreciated that a range of guide slot geometries may be employed. Guide 16 likewise has narrowing slots 19 and 20 leading to confined regions 19a and 20a. To locate the cups guides 15 and 16 are moved towards one another so that cups 11, 12, 13 and 14 are guided by narrowing slots 17, 19, 18 and 20 into confined regions 17a, 19a, 18a and 20a as shown in FIG. 4d. Once guides 15 and 16 have been moved together plate 21 is raised to the position shown in FIG. 4e so that the cups are all maintained at a constant height.

Referring now to FIGS. 5a to 5h a method for holding located cups using a robotic arm will be described. As shown in FIGS. 5a and 5b a robotic arm 22 having grippers 23, 24, 25 and 26 is advanced between the milking cups 11, 12, 13 and 14 to the position shown in FIGS. 5c and 5d. Grippers 23, 24, 25 and 26 then grip cups 11, 12, 13 and 14 as shown in FIGS. 5e and 5f. Each gripper 23, 24, 25 and 26 can be moved towards or away from robotic arm 22 via shafts connected to actuators in robotic arm 22 (for example shaft 27 connected to gripper 25 or shaft 28 connected to gripper 26).

Figure 7B:
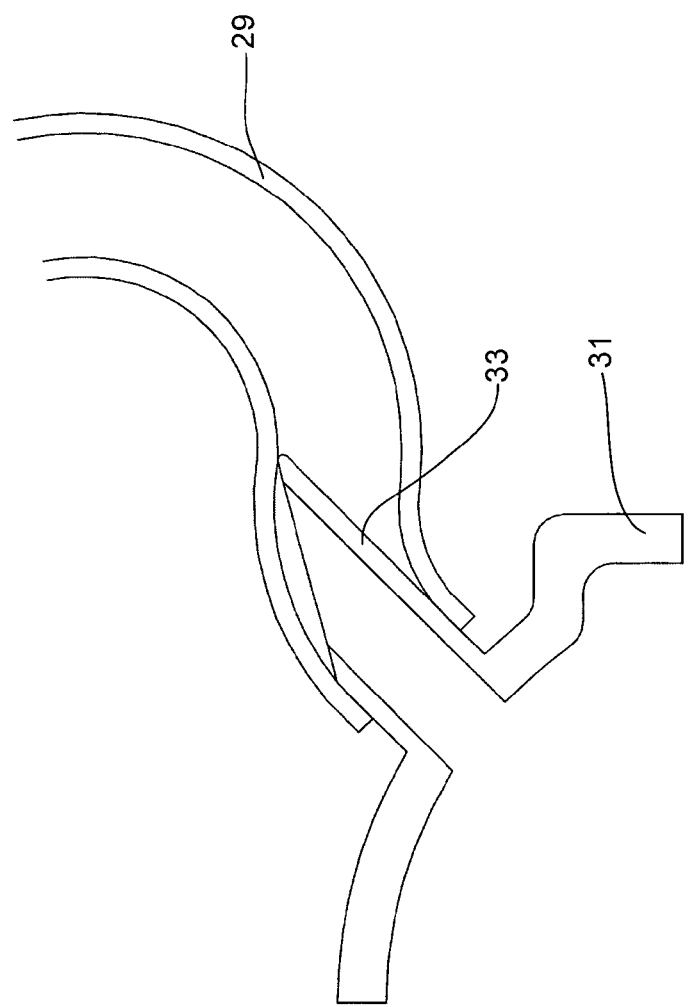
FIGS. 7a and 7b show the operation of the valve formed by a bowl inlet and a feed line.
Figure 7A:
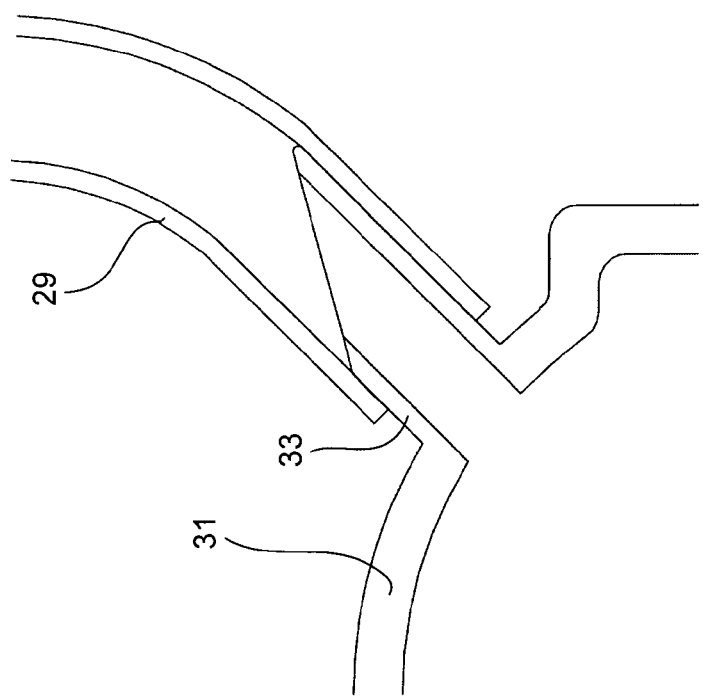

Once the cups have been gripped guides 15 and 16 and plate 21 are moved away. Grippers 23, 24, 25 and 26 may be moved towards robotic arm 22 so that the feed lines are curved so that a wall of each feed line is forced against inlets of the milking bowl to prevent the application of vacuum to the cups. FIGS. 7a and 7b show the operation of the valve formed by the bowl inlet and feed line in detail. In the open position feed line 29 connects to inlet 33 in a straight through fashion. As shown in FIG. 7b when feed line 29 is curved beyond a certain extent one wall of feed line 29 closes the opening of inlet 33 and prevents the application of a vacuum to feed line 29. For example, cup 13 may be moved upwardly so that a wall of feed line 29 is forced against inlet 33 of bowl 31 to act as a valve closing feed line 29. Likewise for feed line 30 and inlet 32. FIGS. 6a and 6b show the cups moved towards robotic arm 22 so as to close feed lines 29 and 30 by forcing a wall of the feed line against the respective inlet 32 and 33.

As shown in FIGS. 6c and 6d and 6e the head of the robotic arm then rotates through 180° to invert the cups so that they may be attached to teats 34 and 35 of an animal. One cup is elevated at a time above the other cups for attachment to the teats of an animal. As shown in FIG. 6g an actuator elevates gripper 26 which raises cup 14 above the other cups. Raising cup 14 also straightens feed line 30 so that a vacuum is applied to cup 14 facilitating its attachment to teat 35 of an animal. Cup 14 may be positioned onto teat 35 via manipulation of robotic arm 22 utilising a conventional vision system to guide the robotic arm. By applying vacuum to one cup at a time a full vacuum may be employed to attach each cup to a teat.

Referring now to FIGS. 6h and 6i, once a cup is attached its gripper 26 is released and the next cup 13 is elevated and attached in a similar manner. Once all cups are attached (FIGS. 6j and 6k) robotic arm 22 is retracted and moved to the next bale to attach the milking cups to the next animal.

When the rotary platform rotates almost through a full revolution and is adjacent the exit area 4 shown in FIG. 1 the vacuum to the milking cluster is disengaged and the cups drop off the teats of the animal. The milking cluster is then retracted via line 8 to be held adjacent anchor point 10 ready for attachment to the next animal. The animal then exits from the rotary platform into the exit area 4.

Referring now to FIGS. 8 to 15 alternative guides for guiding the cups of a milking cluster to desired locations are shown. It will be appreciated that when in their desired locations the cups may be gripped with the robotic milking arm previously described and so gripping the cups with a robotic arm and applying the cups to the teats of animals will not be described in relation to these embodiments—although it will be appreciated that the same method and robotic arm may be used.

Referring to FIG. 8 a milking cluster guide 34 is shown having a central aperture 35 with slots 36 radiating outwardly. A main supply line 37 connected to milking cluster 38 passes through central aperture 35. When the vacuum is shut off from cluster 38 and the cluster drops from the teats of an animal then the cluster may be retracted by line 37. The guide is configured and arranged to allow bowl 39 of milking cluster 38 to pass therethrough (due to material flexibility and/or dimensions) and to position cups 40 to 43 of the milking cluster at the distal regions of slots 36 when the milking cluster is drawn through the guide 34. In this way the cups may be presented oriented upwardly as shown in FIG. 9 ready for collection by a robotic arm (as described previously). The guide may be positioned in a milking bale below the location of the teats of an animal to be milked to facilitate rapid collection and attachment. In this case a removable cover may be provided to cover the cups during animal movement and uncover the cups before attachment of the cups.

Referring now to FIG. 10 an alternative embodiment is shown. In this embodiment bowl 44 remains hanging down and extra long feed lines 45 to 48 are employed. In this case each feed line 45 to 48 passes through a respective aperture 54 to 57 in guide 53. When cups 49 to 52 drop off the teats of an animal when the vacuum is shut off then bowl 44 is raised and cups 49 to 52 are positioned adjacent apertures 54 to 57. The cups 49 to 52 may then be collected by a robotic arm and attached as previously described.

FIGS. 11 and 12 show a variant to the design shown in FIGS. 9 and 10 in which a standard milking cluster is employed having standard lengths for feed lines 58 to 61. In this embodiment an actuator (not shown) may be employed to move guide 67 towards or away from bowl 62. When guide 67 is moved away from bowl 62 cups 63 to 66 are located adjacent apertures 68 to 71 in guide 67 ready for collection by a robotic arm. Once collected by a robotic arm guide 67 is moved towards bowl 62 to allow freedom of movement of cups 63 to 66 for attachment. FIG. 12 shows an inverted arrangement. The arrangement of FIG. 11 could be inverted to the position shown in FIG. 12 prior to attachment or guide 67 could be maintained in the orientation shown in FIG. 12 throughout milking operations.

FIGS. 13 to 15 show another embodiment in which a sheath is used to position the cups of a milking cluster. A main supply line 73 passes through an aperture 74 in sheath 72. When the cups 75 to 78 are released from the teats of an animal main supply line 73 may be raised to draw the bowl 79 and cups 75 to 78 into a cavity 80 within sheath 72. The cavity includes longitudinal grooves 81 to 84 configured to receive cups 75 to 78 and position them in known positions for collection by a robotic arm as shown in FIGS. 14 and 15. Collection and attachment by the robotic arm is thereafter as described above.

Figure 16:
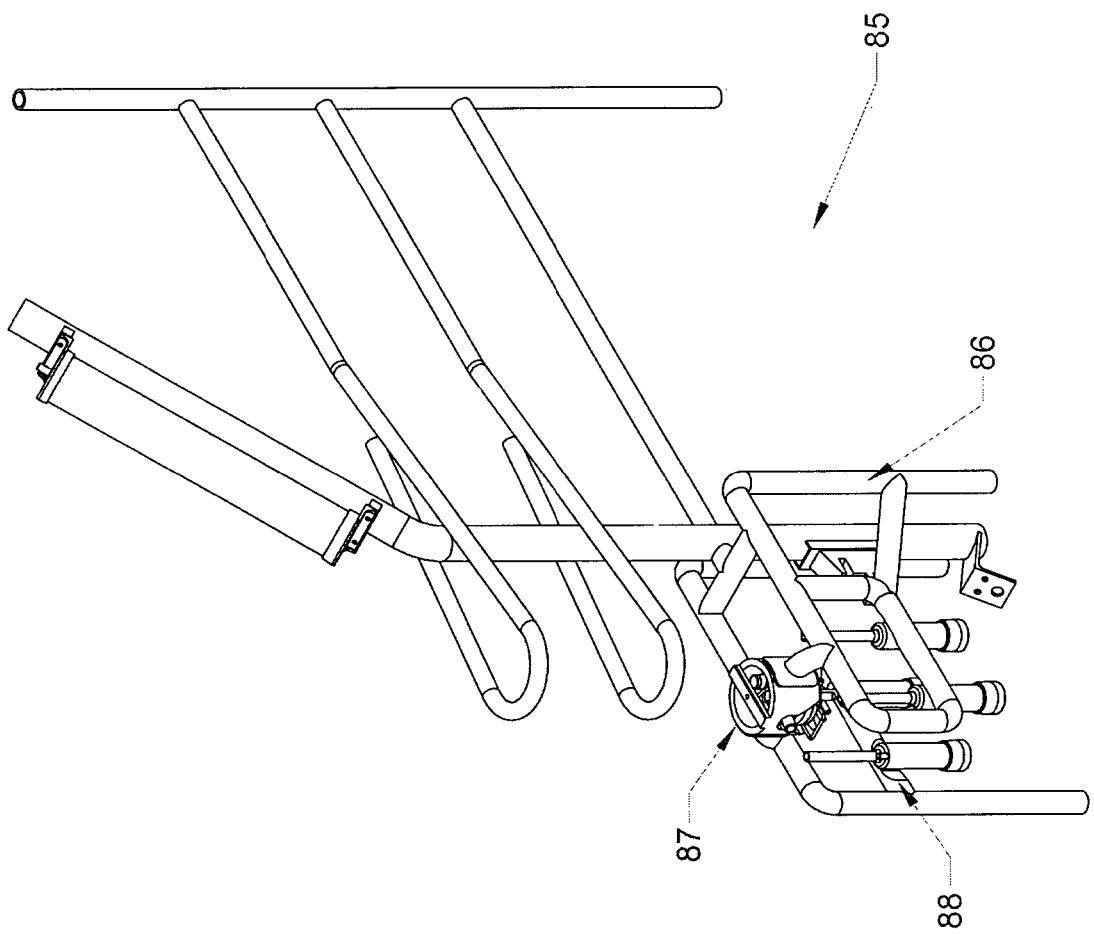
FIG. 16 shows a typical milking parlour bale partition, with additional features for milking cluster location.

FIG. 16 shows an alternative embodiment incorporating a typical milking parlour bale partition 85. To this partition has been added a frame structure 86 incorporating a sheath 87 to locate the milking cluster bowl, and four scalloped recesses 88 to loosely locate the four cups. As the milking cluster is withdrawn following milking, the retractable line is pulled through a guide in the sheath 87 causing the bowl to locate there at the end of the retraction. Guide means within the sheath 87 cause the bowl to be oriented in a repeatable manner. The recesses 88 are positioned to thus line up with the approximate hanging locations of the cups, and act as a guide for the robotic gripper (not shown) during cup pick-up.

FIGS. 17a to 17d show how the robotic gripper 22 picks up and holds the cups 13 and 14 in the guide means shown in FIG. 16. In FIG. 17a, the gripper 22 has been inserted between the left-hand pair of cups 13 and the right-hand pair of cups 14. It is then moved towards the left-hand cups 13 as shown in FIG. 17b, and the left-hand gripper jaws 25 are closed about the pair of cups 13. Moderate cup misalignment is accommodated by the motion of the gripper jaws 25 crowding the cups 13 into the recesses 88. FIG. 17c shows the gripper 22 moved to the right, from where the right-hand jaws 26 have closed about the right-hand pair of cups 14. In FIG. 17d the gripper 22 has moved back to the central position from where it can be withdrawn to attach the cups to the cow.

FIGS. 18a to 18c show a typical milking cup 13. FIG. 18a is an external view of the cup. FIG. 18b shows a cross-section through the cup 13. Inside the external shell of the cup 13 is a cup liner 89 which incorporates the cup opening and the vacuum hose 91 to the claw of the bowl (not shown). Between the opening and the hose 91 the liner 89 seals on the cup shell. During milking air is pulsed through the pulsation line fitting 90 to cause the liner 89 to pulse about the cow's teat and thus stimulate it. FIG. 18c shows an embodiment where the pulsation is paused, and sufficient constant air pressure is applied through the pulsation line fitting 90 to cause the liner 89 to temporarily collapse thus restricting the vacuum flow through the cup. This embodiment can be used to close off the vacuum to cups not attached to the cow's teats in order to ensure that cups that are attached to the teats have sufficient vacuum to hold them on.

Whilst the invention has been described with reference to grippers holding the milking cups it is to be appreciated that the cups may be held using a variety of holding means including suction cups or any other device suitable for holding a milking cup.

The milking system of the present invention allows automation of a conventional multi-bale milking parlour using conventional milking clusters with a single robotic arm. The system allows all four cups of a standard milking cluster to be handled at once achieving high speed cup application. The system also allows conventional vacuum switching to be employed. The relative simplicity of the milking system makes it a robust and cost effective solution.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A robotic milking system comprising:
   a milking cluster having a plurality of cups connected to a bowl;
   a retractor to withdraw the cluster so that the cups hang down below the bowl; and
   a robotic arm that is not permanently attached to the milking cluster arranged to acquire and hold the plurality of cups of the cluster as they hang below the bowl and actuators for moving the arm to facilitate the attachment of the cups to an animal.

2. A robotic milking system as claimed in claim 1 including a guide for locating each cup within a recess in the guide.

3. A robotic milking system as claimed in claim 1 including a guide which, in use, is adapted to advance towards one or more cups and guide each cup to a respective confined region.

4. A robotic milking system as claimed in claim 3 wherein the guide has multiple slots for locating multiple cups and the robotic arm is capable of holding the one or more cups.

5. A robotic milking system as claimed in claim 4 wherein the guide includes two pairs of opposing guides, each having two narrowing slots.

6. A robotic milking system as claimed in claim 1 wherein the cups are held by grippers.

7. A robotic milking system as claimed in claim 6 wherein the grippers are in the form of a pair of opposed arms with internal jaws shaped to grip a cup.

8. A robotic milking system as claimed in claim 7 wherein two pairs of grippers are provided back to back facing in opposing directions with a pair of guides opposing and movable towards each pair of grippers and with each jaw of each gripper aligned with the confined region of each slot.

9. A robotic milking system as claimed in claim 1 wherein the robotic arm is rotatable between a cup location orientation and a cup application orientation.

10. A robotic milking system as claimed in claim 1 wherein the cups of the milking cluster are not all placed on the teats at the same time, and the vacuum flow to any cups not placed on the teats is restricted in order to minimize vacuum loss to cups that are placed on the teats.

11. A robotic milking system as claimed in claim 10 where the cups include a pulsation line and pressure is applied to the pulsation line of cups not attached to the teats, such that the pressure is sufficient to collapse the cup liner.

12. A robotic milking system as claimed in claim 10 where vacuum flow to cups not attached to the teats is restricted by mechanical means.

13. A robotic milking system as claimed in claim 12 wherein the holding means includes means for altering the curvature of a feed line to each cup.

14. A robotic milking system as claimed in claim 1 wherein the robotic arm includes means for independently raising each cup.

15. A robotic milking system as claimed in claim 1 wherein cup attachment is guided by a vision system.

16. A robotic milking system as claimed in claim 1 wherein the robotic milking system independently controls the application of a vacuum to each cup.

17. A milking parlor comprising:
    a plurality of bales; and
    a robotic milking system comprising:
       a milking cluster having a plurality of cups connected to a bowl,
       means to withdraw the cluster so that the cups hang down below the bowl, and
       a robotic arm that is not permanently attached to the milking cluster including holding means arranged to acquire and hold the plurality of cups of the cluster as they hang below the bowl and actuators for moving the arm to facilitate the attachment of the cups to an animal; and
    wherein the robotic milking system is designed to apply cups of conventional milking clusters in each bale.

18. A milking parlor as claimed claim 17 wherein the milking parlor has a rotating platform.

19. A milking parlor as claimed in claim 17 wherein the robotic arm is arranged so as to operate through the rear legs of an animal when attaching cups.

20. A milking parlor as claimed in claim 17 wherein each milking cluster retracts to a position for cup acquisition upon release from an animal.

21. A milking parlor as claimed in claim 20 wherein the bowl is secured by a retractable line in a bale of a milking parlor.

22. A robotic milking system comprising:
    a robotic arm including actuators for moving the robotic arm to facilitate the attachment of cups to a cow;
    a milking cluster comprising a bowl having a plurality of feed lines connected to a plurality of cups, wherein each feed line includes a valve which closes the feed line when the feed line is curved beyond a certain extent and opens when the feed line is not so curved; and
    grippers associated with the robotic arm which, prior to connecting a cup to a teat, holds the cup so that the feed line is curved such that the feed line is closed and, prior to attaching a cup, moves the cup so as to open the feed line.

* * * * *